United States Patent
Lan

(10) Patent No.: US 11,750,898 B2
(45) Date of Patent: Sep. 5, 2023

(54) METHOD FOR GENERATING TARGET VIDEO, APPARATUS, SERVER, AND MEDIUM

(71) Applicant: Beijing Bytedance Network Technology Co., Ltd., Beijing (CN)

(72) Inventor: Feng Lan, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/819,507

(22) Filed: Aug. 12, 2022

(65) Prior Publication Data

US 2022/0385996 A1    Dec. 1, 2022

Related U.S. Application Data

(63) Continuation of application No. PCT/CN2021/112140, filed on Aug. 11, 2021.

(30) Foreign Application Priority Data

Aug. 12, 2020  (CN) .......................... 202010806612.5

(51) Int. Cl.
*H04N 21/8549* (2011.01)
*H04N 21/2187* (2011.01)
(Continued)

(52) U.S. Cl.
CPC ..... *H04N 21/8549* (2013.01); *H04N 21/2187* (2013.01); *H04N 21/233* (2013.01); *H04N 21/23418* (2013.01)

(58) Field of Classification Search
CPC ........... H04N 21/8549; H04N 21/2187; H04N 21/233; H04N 21/23418; H04N 5/2621; G10L 25/57; H04L 65/613; H04L 65/61
See application file for complete search history.

(56) References Cited

U.S. PATENT DOCUMENTS 9,721,165 B1    8/2017 Bentley et al.
10,440,431 B1 * 10/2019 Bulusu ............... H04N 21/4532
(Continued)

FOREIGN PATENT DOCUMENTS

CN    102427507 A    4/2012
CN    103605719 A    2/2014
(Continued)

OTHER PUBLICATIONS

International Search Report and Written Opinion in corresponding application PCT/CN2021/112140, dated Oct. 26, 2021.
(Continued)

*Primary Examiner* — Adil Ocak
(74) *Attorney, Agent, or Firm* — ARENTFOX SCHIFF LLP

(57) ABSTRACT

A method for generating a target video, an apparatus, a server, and a medium are provided. The method includes: obtaining live broadcast stream data, wherein the live broadcast stream data comprises at least one among voice data and live broadcast interaction data, and video data; performing processing on the live broadcast stream data, and generating at least one among a corresponding voice metric value and interaction metric value, and a corresponding video metric value according to a target object included in a processing result; generating an overall metric value for the live broadcast stream data according to the generated metric values; and in response to determining that the comprehensive metric value for the live broadcast stream data satisfies a preset condition, generating a target video on the basis of the live broadcast stream data.

20 Claims, 5 Drawing Sheets

(51) Int. Cl.
H04N 21/233 (2011.01)
H04N 21/234 (2011.01)

(56) References Cited

U.S. PATENT DOCUMENTS

| | | | | |
|---|---|---|---|---|
| 11,503,345 | B2* | 11/2022 | Mickelsen | H04N 21/4394 |
| 2009/0083814 | A1* | 3/2009 | Sekine | H04N 21/84 |
| | | | | 725/104 |
| 2018/0082313 | A1* | 3/2018 | Duggin | G06N 20/00 |
| 2019/0188320 | A1 | 6/2019 | Gordon | |

FOREIGN PATENT DOCUMENTS

| | | | |
|---|---|---|---|
| CN | 107172482 | A | 9/2017 |
| CN | 108650531 | A | 10/2018 |
| CN | 109326310 | A | 2/2019 |
| CN | 110650374 | A | 1/2020 |
| CN | 110856013 | A | 2/2020 |
| CN | 111050191 | A | 4/2020 |
| CN | 111935155 | A | 11/2020 |

OTHER PUBLICATIONS

First Office Action, dated Apr. 26, 2021, Chinese Patent Application No. 202010806612.5, international filing date Aug. 12, 2020.
Notice of Allowance, dated Jul. 1, 2021, Chinese Patent Application No. 202010806612.5, international filing date Aug. 12, 2020.

* cited by examiner

METHOD FOR GENERATING TARGET VIDEO, APPARATUS, SERVER, AND MEDIUM

CROSS REFERENCE OF RELATED APPLICATION

This application is a continuation of International Application No. PCT/CN2021/112140, filed on Aug. 11, 2021, which claims priority to Chinese Patent Application No. 202010806612.5, titled "METHOD FOR GENERATING TARGET VIDEO, APPARATUS, SERVER, AND MEDIUM", filed on Aug. 12, 2020 with the China National Intellectual Property Administration, both of which are incorporated herein by reference in their entireties.

FIELD

The present disclosure relates to the field of computer technology, and in particular to a method and apparatus for generating a target video, a server, and a medium.

BACKGROUND

With the rapid development of Internet technology, live streaming is applied more and more widely.

According to a conventional technology, a video clip is generated by first storing live streaming data as a long video file and then extracting a segment from the long video file manually.

SUMMARY

A method and an apparatus for generating a target video, a server, and a medium are proposed in embodiments of the present disclosure.

In a first aspect, a method for generating a target video is provided according to an embodiment of the present disclosure. The method includes: acquiring live streaming data, wherein the live streaming data includes video data and at least one of audio data and live interaction data; processing the live streaming data to generate, based on an object included in a processing result, a video measurement value and at least one of an audio measurement value and an interaction measurement value; generating, based on the video measurement value and the at least one of the audio measurement value and the interaction measurement value, a comprehensive measurement value of the live streaming data; and generating a target video based on the live streaming data, in response to a determination of the comprehensive measurement value of the live streaming data satisfying a preset condition.

In some embodiments, the processing the live streaming data to generate, based on an object included in a processing result, a video measurement value includes: performing image recognition on video frames in the video data, to determine a quantity of images belonging to a first preset category image and a quantity of images belonging to a second preset category image; and generating the video measurement value based on the quantity of images belonging to the first preset category image and the quantity of images belonging to the second preset category image.

In some embodiments, the generating the video measurement value based on the quantity of images belonging to the first preset category image and the quantity of images belonging to the second preset category image includes: acquiring a preset image weight corresponding to the first preset category image and a preset image weight corresponding to the second preset category image; and calculating a weighted sum of the quantity of images belonging to the first preset category image and the quantity of images belonging to the second preset category image based on the preset image weight corresponding to the first preset category image and the preset image weight corresponding to the second preset category image, to generate the video measurement value.

In some embodiment, the live streaming data includes the audio data, and the processing the live streaming data to generate, based on an object included in a processing result, an audio measurement value includes: performing speech recognition on the audio data to generate speech-recognition texts; determining a quantity of speech-recognition texts belonging to a first preset category text in the speech-recognition texts and a quantity of speech-recognition texts belonging to a second preset category text in the speech-recognition texts; and generating the audio measurement value based on the quantity of speech-recognition texts belonging to the first preset category text and the quantity of speech-recognition texts belonging to the second preset category text.

In some embodiments, the live streaming data includes live interaction data, and the processing the live streaming data to generate, based on an object included in a processing result, an interaction measurement value includes: determining a quantity of target interactions indicated by the live interaction data; and generating the interaction measurement value based on the quantity of target interactions.

In some embodiments, the target interactions include at least two of a first preset interaction, a second preset interaction and a third preset interaction, and the generating the interaction measurement value based on the quantity of target interactions includes: calculating a weighted sum of the quantity of target interactions based on a preset interaction weight corresponding to the first preset interaction, a preset interaction weight corresponding to the second preset interaction, and a preset interaction weight corresponding to the third preset interaction, to generate the interaction measurement value.

In some embodiments, the generating, based on the video measurement value, and the at least one of the audio measurement value and the interaction measurement value, a comprehensive measurement value of the live streaming data includes: acquiring preset weights corresponding to the video measurement value and the at least one of the audio measurement value and the interaction measurement value, respectively; normalizing the video measurement value and the at least one of the audio measurement value and the interaction measurement value; and calculating a weighted sum of the normalized video measurement value and the at least one of the normalized audio measurement value and the normalized interaction measurement value, to generate the comprehensive measurement value of the live streaming data.

In some embodiments, the preset condition includes that a quantity of live streaming slices satisfying a condition for comprehensive measurement value is greater than a target quantity, where the live streaming slices are in a live streaming slice set associated with the live streaming data; and the condition for comprehensive measurement value includes that a comprehensive measurement value corresponding to the live streaming slice is less than the comprehensive measurement value of the live streaming data.

In some embodiments, the live streaming data includes the audio data, and the generating a target video based on the live streaming data includes: determining, based on sentence integrity of a recognized text corresponding to the audio data, a start position and an end position for clipping the live streaming data; and generating the target video based on clipped live streaming data.

In some embodiments, the generating the target video based on the clipped live streaming data includes: adding a special effect to the clipped live streaming data, to generate the target video.

In a second aspect, an apparatus for generating a target video is provided according to an embodiment of the present disclosure. The apparatus includes an acquiring unit, a processing unit, a first generating unit, and a second generating unit. The acquiring unit is configured to acquire live streaming data, wherein the live streaming data includes video data, and at least one of audio data and live interaction data. The processing unit is configured to process the live streaming data to generate, based on an object included in a processing result, a video measurement value and at least one of an audio measurement value and an interaction measurement value. The first generating unit is configured to generate, based on the video measurement value and the at least one of the audio measurement value and the interaction measurement value, a comprehensive measurement value of the live streaming data. The second generating unit is configured to generate a target video based on the live streaming data, in response to a determination of the comprehensive measurement value of the live streaming data satisfying a preset condition.

In some embodiments, the processing unit includes a first recognizing subunit and a first generating subunit. The first recognizing subunit is configured to perform image identification on video frames in the video data, to determine a quantity of images belonging to a first preset category image and a quantity of images belonging to a second preset category image. The first generating subunit is configured to generate the video measurement value based on the quantity of images belonging to the first preset category image and the quantity of images belonging to the second preset category image.

In some embodiments, the first generating subunit includes an acquiring module and a generating module. The acquiring module is configured to acquire a preset image weight corresponding to the first preset category image and a preset image weight corresponding to the second preset category image. The generating module is configured to generate the video measurement value by calculating a weighted sum of the quantity of images belonging to the first preset category image and the quantity of images belonging to the second preset category image based on the preset image weight corresponding to the first preset category image and the preset image weight corresponding to the second preset category image.

In some embodiments, the live streaming data includes audio data, and the processing unit includes a second recognizing subunit, a first determining subunit, and a second generating subunit. The second recognizing subunit is configured to perform speech recognition on audio data to generate speech-recognition texts. The first determining subunit is configured to determine a quantity of speech-recognition texts belonging to a first preset category text and a quantity of speech-recognition texts belonging to a second preset category text. The second generating subunit is configured to generate the audio measurement value based on the quantity of speech-recognition texts belonging to the first preset category text and the quantity of speech-recognition texts belonging to the second preset category text.

In some embodiments, the live streaming data includes live interaction data. The processing unit includes a second determining subunit and a third generating subunit. The second determining subunit is configured to determine a quantity of target interactions indicated by the live interaction data. The third generating subunit is configured to generate the interaction measurement value based on the quantity of target interactions.

In some embodiments, the target interactions include at least two of a first preset interaction, a second preset interaction and a third preset interaction. The third generating subunit is further configured to calculate a weighted sum based on the quantity of target interactions, a preset interaction weight corresponding to the first preset interaction, a preset interaction weight corresponding to the second preset interaction, and a preset interaction weight corresponding to the third preset interaction, to generate the interaction measurement value.

In some embodiments, the first generating unit includes an acquiring subunit, a normalization subunit, and a fourth generating subunit. The acquiring subunit is configured to acquire a preset weight corresponding to the video measurement value, and the at least one of a preset weight corresponding to the audio measurement value and a preset weight corresponding to the interaction measurement value, respectively. The normalization subunit is configured to normalize the video measurement value and the at least one of the audio measurement value and the interaction measurement value. The fourth generating subunit is configured to calculate a weighted sum of the normalized video measurement value and the at least one of the normalized audio measurement value and the normalized interaction measurement value, to generate the comprehensive measurement value of the live streaming data.

In some embodiments, the preset condition includes that a quantity of live streaming slices satisfying a condition for comprehensive measurement value is greater than a target quantity, where the live streaming slices are in a live streaming slice set associated with the live streaming data, and the condition for comprehensive measurement value includes that a comprehensive measurement value corresponding to the live streaming slice is less than the comprehensive measurement value of the live streaming data.

In some embodiment, the live streaming data includes audio data. The second generating unit includes a third determining subunit and a fifth generating subunit. The third determining subunit is configured to determine, based on sentence integrity of a recognized text corresponding to the audio data, a start position and an end position for clipping the live streaming data. The fifth generating subunit is configured to generate the target video based on clipped live streaming data.

In some embodiments, the fifth generating subunit is further configured to add a special effect to the clipped video streaming data, and generate the target video.

In a third aspect, a server is provided according to an embodiment of the present disclosure. The server includes at least one processor and a storage device storing at least one program. The program, when executed by the processor, causes the processor to implement the method according to any implementation described in the first aspect.

In a fourth aspect, a computer-readable medium having a computer program stored thereon is provided according to an embodiment of the present disclosure. The program, when executed by the processor, causes the processor to implement the method according to any implementation described in the first aspect.

In a fifth aspect, a computer program product including computer program instructions is provided according to an embodiment of the present disclosure. The computer program instructions, when executed by a computer, cause the computer to implement the method according to any implementation described in the first aspect.

In a sixth aspect, a computer program is provided according to an embodiment of the present disclosure. The computer program, when executed by a computer, causes the computer to implement the method according to any implementation described in the first aspect.

With the method and the apparatus for generating the target video, the server, and the medium proposed in embodiments of the present disclosure, video data and at least one of audio data and live interaction data in acquired live streaming data are processed separately; a comprehensive measurement value is generated based on a video measurement value and at least one of an audio measurement value and an interaction measurement value; and a target video is finally generated. On one hand, a target video is generated automatically; and on the other hand, a basis for generating a target video is determined comprehensively from video data and at least one of audio data and live interaction data, so that quality and efficiency in generating the target video are improved.

BRIEF DESCRIPTION OF THE DRAWINGS

Other features, objectives and advantages of the present disclosure will become more apparent by reading detailed description of non-limiting embodiments made with reference to accompany drawings, in which.

DETAILED DESCRIPTION

Figure 1:
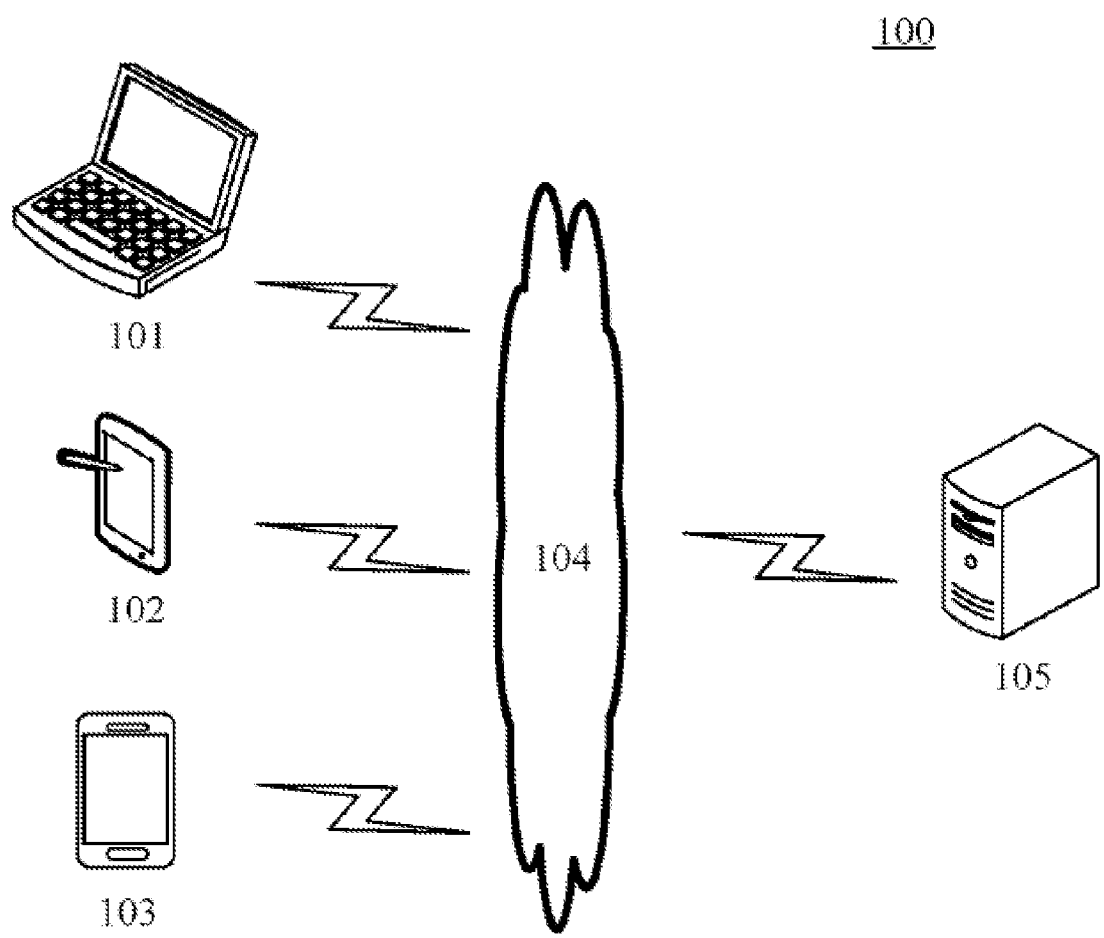
FIG. 1 is an exemplary diagram showing an applicable system architecture according to an embodiment of the present disclosure.

Embodiments of the present disclosure are described in detail below with reference to the accompanying drawings. It should be understood that the embodiments described herein are intended to explain the present disclosure, rather than to limit the present disclosure. It should be further noted that only the parts related to the present disclosure are shown in the drawings for each of description.

It should be further noted that embodiments of the present disclosure and features in the embodiments may be combined with each other without conflict. The present disclosure is illustrated in detail below with reference to the accompanying drawings and in conjunction with the embodiments.

FIG. 1 shows an exemplary architecture 100 to which a method for generating a target video or an apparatus for generating a target video according to an embodiment of the present disclosure may be applied.

As shown in FIG. 1, the system architecture 100 may include terminal devices 101, 102, and 103, a network 104, and a server 105. The network 104 is used to provide a medium for a communication link between a terminal device 101, 102, or 103 and the server 105. The network 104 may include various connection types, such as wired communication links, wireless communication links, or fiber optic cables.

Each of the terminal devices 101, 102, and 103 interacts with the server 105 via the network 104, to receive or send messages, and the like. Various communication client applications may be installed on the terminal devices 101, 102 and 103. Examples of the communication client applications include a web browser application, a shopping application, a search application, an instant messaging tool, an email-box client, software of a social platform, a text editing application, a live streaming application, and the like.

Each of the terminal devices 101, 102, and 103 may be implemented by hardware or software. The terminal devices 101, 102, and 103, when implemented by hardware, may be various electronic devices having a display screen and supporting transmission of audio/video, including but not limited to smart phones, tablet computers, laptop computers, and desktop computers. The terminal devices 101, 102, and 103, when implemented by software, may be installed in the electronic devices listed above. The terminal devices may be implemented as multiple software modules or software modules (such as software modules or software modules for providing distributed services), or may be implemented as a single software module or a single software module, which is not specifically limited herein.

The server 105 may provide various services, for example, serves as a background server providing support for a live streaming application on the terminal device 101, 102, or 103. The background server may perform analysis and processing on received live streaming data, and return a processing result (such as a target video) to the terminal device.

It should be noted that the live streaming data may be stored locally on the server 105, and the server 105 may extract and perform processing on the locally stored live streaming data. In this case, the terminal devices 101, 102, and 103 and the network 104 may be omitted.

It should be noted that the server may be implemented by hardware or software. The server, when implemented by hardware, may be implemented as a distributed server cluster composed of multiple servers, or may be implemented as a single server. When implemented by software, the server may be implemented as multiple software modules or software modules (such as software modules or software modules for providing distributed services), or may be implemented as a single software module or a single software module, which is not specifically limited herein.

It should be noted that a method for generating a target video according to an embodiment of the present disclosure is generally performed by the server 105, and an apparatus for generating a target video is generally provided in the server 105.

It should be noted that each of the terminals 101, 102 and 103 may be configured to perform a method for generating a target video. The terminal 101 may also be configured to collect live streaming data, and send the collected live streaming data to the server 105, such that the server 105 performs the method for generate the target video.

It should be understood that quantities of the terminal devices, the network and the server shown in FIG. 1 are merely illustrative. There may be any quantity of terminal devices, networks and servers based on a requirement for implementation.

Figure 2:
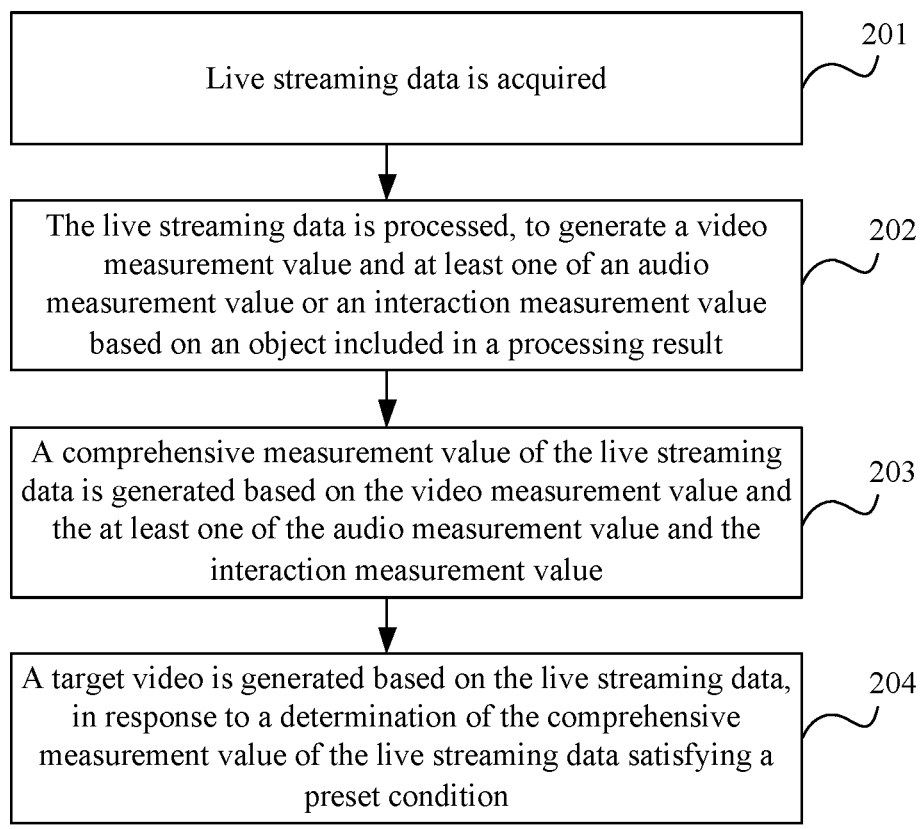
FIG. 2 is a flowchart of a method for generating a target video according to an embodiment of the present disclosure.

Reference is made to FIG. 2 which shows a process 200 of a method for generating a target video according to an embodiment of the present disclosure. The method for generating the target video includes steps 201 to 204.

In step 201, live streaming data is acquired.

In some embodiments, the live streaming data may be acquired, by an executor of the method for generating the target video (such as the server 105 in FIG. 1), through a wired connection or a wireless connection. The live streaming data may include video data, and at least one of audio data and live interaction data. Therefore, the live streaming data may include video data and audio data, or include video data and live interaction data, or include video data, audio data, and live interaction data. The audio data is usually time-synchronized with the video data. The live interaction data may include data recording an interaction between a host and audiences in a live streaming process. The live interaction data may include, but is not limited to, at least one of: the number of bullet screens in a preset time period (for example, per minute), the number of appreciations (such as likes, or gifts) for the host in a preset time period (for example, per minute), or the number of comments and messages in a preset period (for example, per minute).

As an example, the method executor may acquire the live streaming data in real time from an electronic device (such as a terminal device shown in FIG. 1) communicatively connected to the executor. As another example, the method executor may acquire local live streaming data that is locally pre-stored. The live streaming data may be pre-stored and obtained by performing video slicing on historical live streaming data. A video slicing may correspond to a start time and an end time in the historical live streaming data.

In step 202, the live streaming data is processed, to generate a video measurement value and at least one of an audio measurement value and an interaction measurement value based on an object included in a processing result.

In some embodiments, the live streaming data obtained in step 201 may be processed by the executor in various ways. A video measurement value, and at least one of an audio measurement value and an interaction measurement value may be generated by the executor based on a target object included in a processing result.

In an embodiment, as an example, the executor may extract, in various ways, an acoustic feature from the audio data in the acquired live streaming data. The acoustic feature may include, but is not limited to, at least one of: Mel Frequency Cepstrum Coefficient (MFCC), Linear Prediction Cepstrum Coefficient (LPCC), pitch, tone quality, or volume. Then, the executor may generate, in various ways, an audio measurement value corresponding to the extracted acoustic feature. For example, the executor may generate the audio measurement value by using a pre-trained artificial neural network. The artificial neural network may be trained by using the audio data corresponding to highlight clips of historical live streaming data as positive samples and using the audio data corresponding to ordinary clips of historical live streaming data as negative samples. The audio measurement value may be between 0 and 1. For another example, the executor may compare the extracted acoustic features with a preset threshold corresponding to the acoustic features, and then generate an audio measurement value corresponding to the extracted acoustic features based on the quantity of acoustic features which are greater than the preset threshold corresponding to the acoustic features.

In an embodiment, as an example, the executor may process, in various ways, the live interaction data in the live streaming data, to generate an interaction measurement value. For example, the executor may determine the quantity of time periods in which the number of bullet screens or the number of comments exceeds a preset threshold as the interaction measurement value. For example, the live streaming data includes a content which lasts for 5 minutes. The number of bullet screens in a first minute is 15, the number of bullet screens in a second minute is 28, the number of bullet screens in a third minute is 85, the number of bullet screens in a fourth minute is 66, and the number of bullet screens in a fifth minute is 32. Assuming that the preset threshold is 50, the interaction measurement value may be determined as 2, by the executor.

In an embodiment, as an example, the executor may process, in various ways, the video data in the live streaming data, to generate a video measurement value. For example, the executor may determine, from the live streaming data, the number of video frames including a target image. The video measurement value corresponding to the live streaming data is generated based on the number of video frames including the target image.

In some implementations, a process of processing the live streaming data to generate, based on an object included in a processing result, a video measurement value may be performed by the executor through the following steps.

In a first step, image recognition is performed on video frames in the video data, to determine the quantity of images belonging to a first preset category image and the quantity of images belonging to a second preset category image.

In such implementations, the executor may perform image recognition on the video frames in the video data through various image recognition methods, and determine the quantity of images belonging to the first preset category image and the quantity of images belonging to the second preset category image. The images belonging to the first preset category image and the images belonging to the second preset category image may include preset images associated with application scenarios. As an example, the images belonging to the first preset category image may be an image of dunking, and the images belonging to the second preset category image may be an image of shooting outside the three-point line.

In an example, the executor may extract frames from the video data, for example, extract 1 frame every 10 frames, and then perform image recognition on the extracted frames, so as to saves computing resource.

In an example, the first preset category image may include images for indicating a commodity sale, such as a commodity image and a price tag. The second preset category image may include an image of a preset character. The preset character may be, for example, a video host. In this way, the method may provide a technical basis for identifying highlight moments in a live sale video from the perspective of image recognition.

In a second step, the video measurement value is generated based on the quantity of images belonging to the first preset category image and the quantity of images belonging to the second preset category image.

In such implementations, the executor may generate the video measurement value in various ways based on the determined quantity of images belonging to the first preset category image and the determined quantity of images belonging to the second preset category image. As an example, the executor may select a larger one of the quantity of images belonging to the first preset category image and the quantity of images belonging to the second preset category image, as the video measurement value. As another example, the executor may determine a ratio of the larger one of the quantity of images belonging to the first preset category image and the quantity of images belonging to the second preset category image to the quantity of video frames for image recognition, as the video measurement value.

In an example, the executor may first acquire preset image weights (such as 1 and 0.5) corresponding to the first preset category image and the second preset category image, respectively. Then, the executor may calculate a weighted sum of the quantity of images belonging to the first preset category image and the quantity of images belonging to the second preset category image based on the preset image weights, to generate the video measurement value.

In some implementations, based on the audio data in the live streaming data, the executor may process the live streaming data and generate an audio measurement value through the following steps.

In a first step, speech recognition is performed on the audio data to generate speech-recognition texts.

In such implementations, various speech recognition technologies may be applied by the executor to perform speech recognition on the audio data in the live streaming data obtained in step 201, to generate the speech-recognition texts.

In a second step, the quantity of speech-recognition texts belonging to a first preset category text and the quantity of speech-recognition texts belonging to a second preset category text are determined.

In such implementations, the executor determines, in various ways, the quantity of speech-recognition texts belonging to the first preset category text and the quantity of speech-recognition texts belonging to the second preset category text. The first preset category text and the second preset category text may include preset texts associated with application scenarios. As an example, the first preset category text may include preset descriptive words such as "good shot", "beautiful", or "really wonderful"; and the second preset category text may include prompt words such as "let's take a look", or "note that".

In an example, the first preset category text may include commodity description information, such as a commodity name, or comments for a commodity (such as "delicious", and "easy to use and not expensive"). The second preset category text may include preset sale keywords, such as "activate a purchase link", or "come to buy". In this way, the method may provide a technical basis for identifying highlight moments in a live sale video from the perspective of speech recognition.

In a third step, the audio measurement value is generated based on the quantity of texts belonging to the first preset category text and the quantity of texts belonging to the second preset category text.

In such implementations, the audio measurement value may be generated by the executor in various ways based on the determined quantity of texts belonging to the first preset category text and the determined quantity of texts belonging to the second preset category text. As an example, the executor may select a larger one of the quantity of texts belonging to the first preset category text and the quantity of texts belonging to the second preset category text, as the audio measurement value. As another example, the executor may determine a ratio of the larger one of the quantity of texts belonging to the first preset category text and the quantity of texts belonging to the second preset category text to the quantity of words in the speech-recognition text, as the audio measurement value.

In an example, the executor may first acquire text preset weights corresponding to the first preset category text and second preset category text, respectively. Then, the executor may calculate a weighted sum of the quantity of texts belonging to the first preset category text and the quantity of texts belonging to the second preset category text based on the preset text weights, to generate the audio measurement value.

In an example, based on the commodity description information in the first preset category text and the preset sale keywords in the second preset category text, a preset text weight (For example, 1) corresponding to the first preset category text is usually less than the preset text weight (for example, 5) corresponding to the second preset category text.

In some implementations, the executor may process the live streaming data based on the live interaction data included in the live streaming data through the following steps, to generate an interaction measurement value based on a processing result.

In a first step, the quantity of target interactions indicated by the live interaction data is determined.

In such implementations, the executor may determine the quantity of target interactions indicated by the live interaction data in the live streaming data obtained in step 201 in various ways. The target interactions may include, but are not limited to, at least one of: sending a bullet screen, sending appreciation to a host (such as sending like or gift), publishing a comment, and leaving a message.

In a second step, an interaction measurement value is generated based on the quantity of target interactions.

In such implementations, the executor may generate the interaction measurement value in various ways based on the quantity of target interactions determined in the previous step. As an example, the executor may determine that the interaction measurement value is equal to the quantity of target interactions. As another example, the executor may determine that the interaction measurement value is equal to a ratio of the quantity of target interactions to a preset value.

In an example, the target interactions may include at least two of a first preset interaction, a second preset interaction, and a third preset interaction. Based on the quantity of target interactions determined, the executor may calculate a weighted sum based on the quantity of target interactions, a preset interaction weight corresponding to the first preset interaction, a preset interaction weight corresponding to the second preset interaction, and a preset interaction weight corresponding to the third preset interaction, to generate the interaction measurement value. The first preset interaction, the second preset interaction, and the third preset interaction may include preset interactions associated with application scenarios.

In an example, the first preset interaction, the second preset interaction, and the third preset interaction may include presenting a commodity link on a live screen, generating an order through the commodity link provided in the live streaming data, and sending a bullet screen, respectively. In this way, the method may provide a technical basis for identifying highlight moments in a live sale from the perspective of interactions.

In step 203, a comprehensive measurement value of the live streaming data is generated based on the video measurement value and the at least one of the audio measurement value and the interaction measurement value.

In some embodiments, the executor may generate the comprehensive measurement value of the live streaming data in various ways based on the video measurement value and at least one of the audio measurement value and the interaction measurement value. As an example, the executor may select a maximum among the video measurement value and at least one of the audio measurement value and the interaction measurement value, as the comprehensive measurement value of the live streaming data.

In some implementations, the executor may generate the comprehensive measurement value of the live streaming data based on the video measurement value and at least one of the audio measurement value and the interaction measurement value through the following steps.

In a first step, a preset weight corresponding to the video measurement value and the at least one of a preset weight corresponding to the audio measurement value and a preset weight corresponding to the interaction measurement value are acquired.

In such implementations, the executor may first acquire a preset weight corresponding to the video measurement value and the at least one of a preset weight corresponding to the audio measurement value and a preset weight corresponding to the interaction measurement value. For example, the preset weights may be 0.3, 0.3, and 0.4, respectively.

In a second step, the video measurement value and the at least one of the audio measurement value and the interaction measurement value are normalized.

In such implementations, the executor may normalizes the video measurement value and the at least one of the audio measurement value and the interaction measurement value generated in the first step. Therefore, the normalized video measurement value and the at least one of the normalized audio measurement value and the normalized interaction measurement value are at the same order of magnitude.

In a third step, a weighted sum of the normalized video measurement value and the at least one of the normalized audio measurement value and the normalized interaction measurement value is calculated to generate the comprehensive measurement value of the live streaming data.

In implementations, the executor calculates a weighted sum of the normalized video measurement value and the at least one of the normalized audio measurement value and the normalized interaction measurement value obtained in the second step, to generate the comprehensive measurement value of the live streaming data.

In step 204, a target video is generated based on the live streaming data, in response to a determination of the comprehensive measurement value of the live streaming data satisfying a preset condition.

In some embodiments, in response to the determination of the comprehensive measurement value of the live streaming data satisfying the preset condition, the executor may generate the target video based on the live streaming data in various ways. As an example, the preset condition may include that the comprehensive measurement value of the live streaming data is greater than a preset threshold. As an example, the target video may be used as the live streaming data by the executor. As another example, the executor may perform post-processing on the live streaming data to obtain the target video. The post-processing may include, for example, adding a filter, adjusting brightness, or adjusting contrast.

In some implementations, the preset condition may include that: the quantity of live streaming slices satisfying a condition for a comprehensive measurement value in a live streaming slice set associated with the live streaming data is greater than a target quantity. The condition for comprehensive measurement value may include that a comprehensive measurement value corresponding to the live streaming slice is less than the comprehensive measurement value of the live streaming data. The target quantity may be any number pre-determined based on an actual application requirement. The target quantity may be determined according to a rule, such as a quantity obtained by multiplying the quantity of live streaming slices in the live streaming slice set by a preset ratio.

As an example, the live streaming slice set associated with the live streaming data may include slices of the live streaming data obtained over different time periods corresponding to the same live streaming information source (such as a room id). Assuming that the live streaming slice set associated with the live streaming data includes 10 live streaming slices and the target quantity is 6. If the comprehensive measurement value of the live streaming slice set is less than the comprehensive measurement value of the live streaming data and greater than 6, the preset condition is satisfied.

Figure 3:
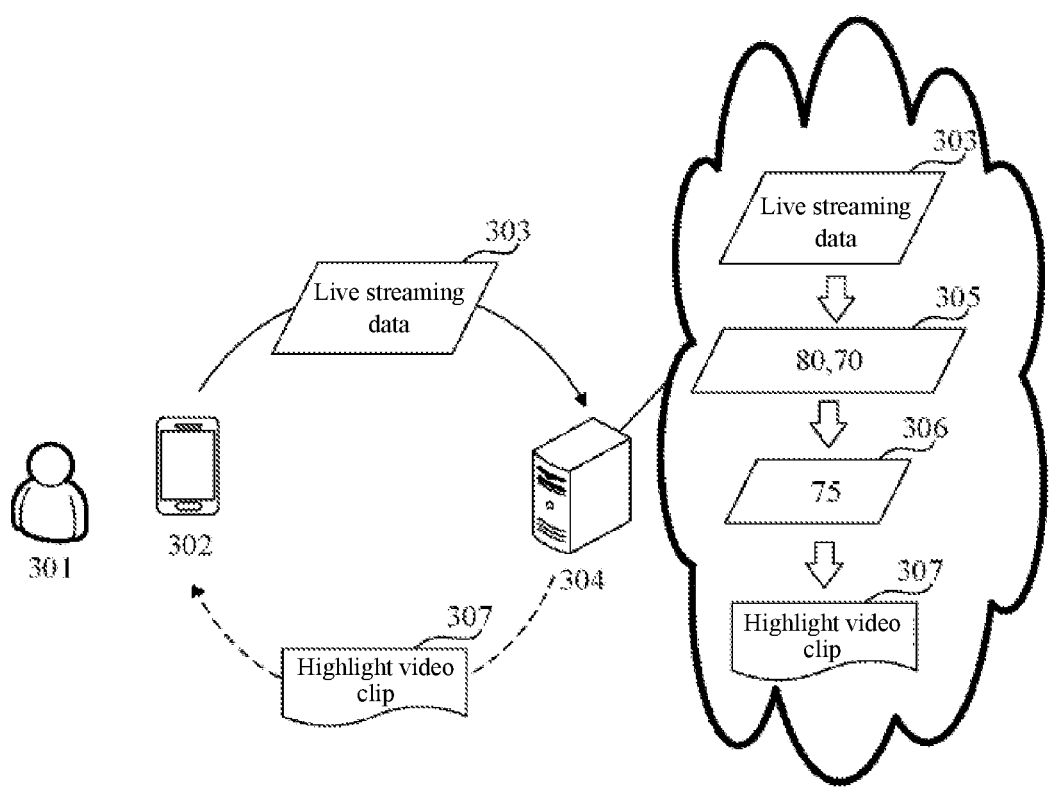
FIG. 3 is a schematic diagram showing an application scenario for a method for generating a target video according to an embodiment of the present disclosure.

Reference is made to FIG. 3, which is a schematic diagram of an application scenario of a method for generating a target video according to an embodiment of the present disclosure. In the application scenario shown in FIG. 3, a user 301 performs a live streaming by a terminal device 302. Live streaming data 303 is transmitted from the terminal device 302 to a background server 304. The live streaming data may include audio data and video data. The background server 304 processes the live streaming data 303 to generate an audio measurement value of 80 and a video measurement value of 70 (shown as 305 in FIG. 3) based on objects characterizing a degree of impressiveness (such as a speech of "good shot" or an image of dunking). Then, the background server 304 calculates an average of the audio measurement value and the video measurement value to generate a comprehensive measurement value of 75 (shown as 306 in FIG. 3). Then, in response to the comprehensive measurement value of 75 being greater than a preset threshold (for example, 70), the background server 304 may generate a video clip 307 based on the live streaming data 303. In an example, the background server 304 may further send the generated video clip 307 to the terminal device 302.

According to a conventional technology, a video clip is generated by first storing live streaming data as a video file and then extracting a segment from the video file manually, which requires massive labor cost. With the method provided in the embodiments of the present disclosure, video data and at least one of audio data and live interaction data in acquired live streaming data are processed separately to generate a video measurement value and at least one of an audio measurement value and an interaction measurement value; a comprehensive measurement value is then obtained based on the video measurement value and the at least one of an audio measurement value and an interaction measurement value; and a target video is finally generated. Compared with a method of generating the target video through manual extraction, the solution in the present disclosure realizes an automatic generation of a target video and effectively reduces labor cost. Compared with a method of generating the target video based on only a single dimension such as audio or video, a basis for generating a target video is determined comprehensively from video and at least one of speech and live interaction in the solution according to the present disclosure, so that quality and efficiency in generating the target video are improved.

Figure 4:
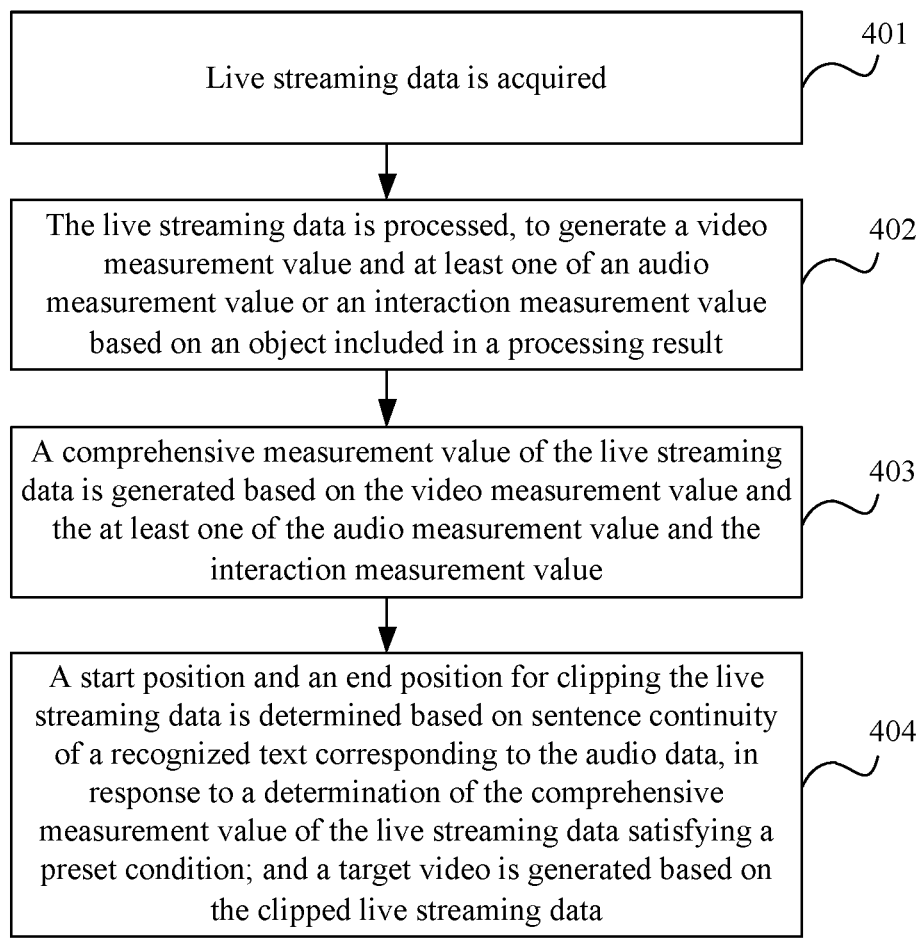
FIG. 4 is a flowchart of a method for generating a target video according to another embodiment of the present disclosure.

Reference is made to FIG. 4, which shows a process 400 of a method for generating a target video according to another embodiment. The process 400 of the method for generating the target video includes steps 401 to 404.

In step 401, live streaming data is acquired.

In an embodiment, the live streaming data may include audio data and video data.

In step 402, the live streaming data is processed, to generate a video measurement value and at least one of an audio measurement value and an interaction measurement value based on an object included in a processing result.

In step 403, a comprehensive measurement value of the live streaming data is generated based on the video measurement value and the at least one of the audio measurement value and the interaction measurement value.

The step 401, step 402, and step 403 are respectively consistent with the step 201, step 202, and step 203 and possible implementations thereof in the foregoing embodiments, and description of the step 201, step 202, and step 203 and possible implementations thereof is also applicable to step 401, step 402 and step 403, which will not be repeated herein.

In step 404, a start position and an end position for clipping the live streaming data is determined based on sentence continuity of a recognized text corresponding to the audio data, in response to a determination of the comprehensive measurement value of the live streaming data satisfying a preset condition; and a target video is generated based on the clipped live streaming data.

In an embodiment, in response to a determination of the comprehensive measurement value of the live streaming data satisfying the preset condition, an executor that performs the method for generating the target video (such as the server 105 in FIG. 1) may generate the target video through the following steps.

In a first step, a start position and an end position for clipping the live streaming data is determined based on sentence integrity of a recognized text corresponding to the audio data.

In some embodiments, the executor may first determine the sentence integrity of the recognized text corresponding to the audio data, and then determine the start position and the end position for clipping the live streaming data, in various ways based on the sentence integrity. The start position and the end position for clipping may include a start position for clipping and an end position for clipping. As an example, in response to a determination of the recognized text corresponding to the audio data having a complete sentence (for example, a sentence "XX is really delicious"), the executor may determine a start position and an end position of the audio data as the start position and the end position for clipping. As another example, in response to a determination of the recognized text corresponding to the audio data having an incomplete sentence (for example, a sentence "is too wonderful", "next please pay attention to the"), the executor may determine an end position of the sentence being the later part of an complete sentence, as the start position for clipping; and determine a start position of the sentence being the first part of an complete sentence, as the end position for clipping.

In a second step, a target video is generated based on the clipped live streaming data.

In some embodiments, the executor may generate the target video in various ways based on the clipped live streaming data. As an example, the executor may directly determine the clipped live streaming data as the target video. As another example, the executor may perform post-processing on the clipped live streaming data, and generate the target video based on the post-processed live streaming data.

In some implementations, the executor may add a special effect to the clipped video streaming data, to generate the target video. The special effect may include, but is not limited to, at least one of a subtitle, a sticker, and a transition effect.

As can be seen from FIG. 4, the process 400 of the method for generating the target video in the embodiment includes: a step of determining, based on sentence integrity of a recognized text corresponding to the audio data, a start position and an end position for clipping the live streaming data; and a step of generating a target video based on the clipped live streaming data. Therefore, with the solution described in the embodiment, the target video may be generated based on the sentence integrity of the recognized text corresponding to the audio data, which ensures the sentence integrity in the target video.

Figure 5:
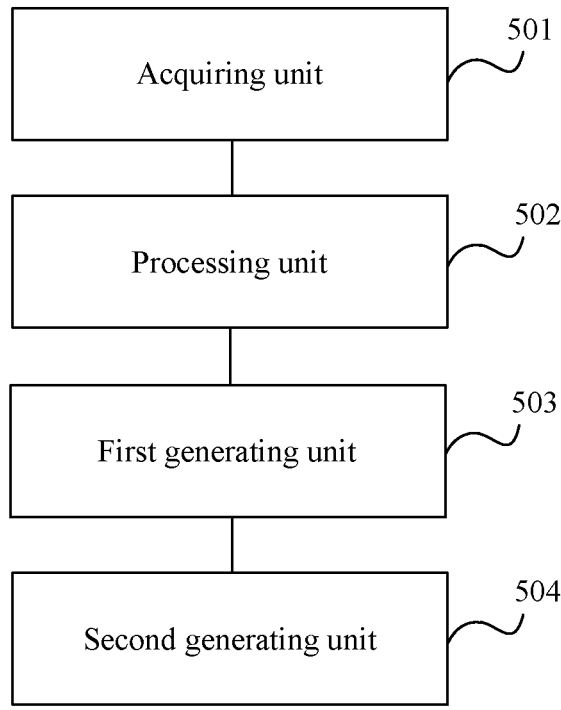
FIG. 5 is a schematic structural diagram of an apparatus for generating a target video according to an embodiment of the present disclosure.

Referring to FIG. 5, as an implementation of the method shown in the figures, an apparatus for generating a target video is provided according an embodiment of the present disclosure. The apparatus embodiment corresponds to the method embodiments shown in FIG. 2 or FIG. 4. The apparatus may be applied to various electronic devices.

As shown in FIG. 5, the apparatus 500 for generating a target video in the embodiment includes an acquiring unit 501, a processing unit 502, a first generating unit 503 and a second generating unit 504. The acquiring unit 501 is configured to acquire live streaming data, where the live streaming data includes video data and at least one of audio data and live interaction data. The processing unit 502 is configured to process the live streaming data to generate, based on an object included in a processing result, a video measurement value and at least one of an audio measurement value and an interaction measurement value. The first generating unit 503 is configured to generate a comprehensive measurement value of the live streaming data, based on the video measurement value and the at least one of the audio measurement value and an interaction measurement value. The second generating unit 504 is configured to generate a target video based on the live streaming data, in response to a determination of the comprehensive measurement value of the live streaming data satisfying a preset condition.

In some embodiments, specific processing of the acquiring unit 501, the processing unit 502, the first generating unit 503 and the second generating unit 504 in the apparatus 500 for generating the target video and technical effects thereof may be referred to relevant description of step 201, step 202, step 203, and step 204 in the embodiment of FIG. 2, respectively, which will not be repeated herein.

In some implementations of the present disclosure, the processing unit 502 may include a first recognizing subunit (not shown in the drawings) and a first generating subunit (not shown in the drawings). The first recognizing subunit may be configured to perform image identification on video frames in the video data, to determine a quantity of images belonging to a first preset category image and a quantity of images belonging to a second preset category image. The first generating subunit may be configured to generate the video measurement value based on the quantity of images belonging to the first preset category image and the quantity of images belonging to the second preset category image.

In some implementations of the present disclosure, the first generating subunit may include an acquiring module (not shown in the drawings) and a generating module (not shown in the drawings). The acquiring module may be configured to acquire a preset image weight corresponding to the first preset category image and a preset image weight corresponding to the second preset category image. The generating module may be configured to calculate a weighted sum of the quantity of images belonging to the first preset category image and the quantity of images belonging to the second preset category image based on the preset image weight corresponding to the first preset category image and the preset image weight corresponding to the second preset category image, to generate the video measurement value.

In some implementations of the present disclosure, the live streaming data may include audio data. The processing unit 502 may include a second recognizing subunit (not shown in the drawings), a first determining subunit (not shown in the drawings), and a second generating subunit (not shown in the drawings). The second recognizing subunit may be configured to perform speech recognition on audio data to generate speech-recognition texts. The first determining subunit may be configured to determine the quantity of speech-recognition texts belonging to a first preset category text and the quantity of speech-recognition texts belonging to a second preset category text. The second generating subunit may be configured to generate the audio measurement value based on the quantity of speech-recognition texts belonging to the first preset category text and the quantity of speech-recognition texts belonging to the second preset category text.

In some implementation, the live streaming data may include live interaction data. The processing unit 502 may include a second determining subunit (not shown in the drawings) and a third generating subunit (not shown in the drawings). The second determining subunit may be configured to determine the quantity of target interactions indicated by the live interaction data. The third generating subunit may be configured to generate the interaction measurement value based on the quantity of target interactions.

In some implementations, the target interactions may include at least two of a first preset interaction, a second preset interaction and a third preset interaction. The third generating subunit may be further configured to generate calculate a weighted sum based on the quantity of target interactions, a preset interaction weight corresponding to the first preset interaction, a preset interaction weight corresponding to the second preset interaction, and a preset interaction weight corresponding to the third preset interaction, to generate the interaction measurement value.

In some implementations, the first generating unit 503 may include an acquiring subunit (not shown in the drawings), a normalization subunit (not shown in the drawings), and a fourth generating subunit (not shown in the drawings). The acquiring subunit may be configured to acquire a preset weight corresponding to the video measurement value, and the at least one of a preset weight corresponding to the audio measurement value and a preset weight corresponding to the interaction measurement value. The normalization subunit may be configured to normalize the video measurement value and the at least one of the audio measurement value and the interaction measurement value. The fourth generating subunit may be configured to calculate a weighted sum of the normalized video measurement value and the at least one of the normalized audio measurement value and the normalized interaction measurement value, to generate the comprehensive measurement value of the live streaming data.

In some optional implementations, the preset condition may include that the quantity of live streaming slices satisfying a condition for comprehensive measurement value in a live streaming slice set associated with the live streaming data is greater than a target quantity. The condition for comprehensive measurement value includes that a comprehensive measurement value corresponding to the live streaming slice is less than the comprehensive measurement value of the live streaming data.

In some implementations, the live streaming data may include audio data. The second generating unit 504 may include a third determining subunit (not shown in the drawings) and a fifth generating subunit (not shown in the drawings). The third determining subunit may be configured to determine, based on sentence integrity of a recognized text corresponding to the audio data, a start position and an end position for clipping the live streaming data. The fifth generating subunit may be configured to generate the target video based on the clipped live streaming data after clipping.

In some implementations, the fifth generating subunit may be further configured to add a special effect to the clipped video streaming data, and generate the target video.

With the apparatuses provided in the embodiments of the present disclosure, the acquiring unit 501 acquires live streaming data, where the live streaming data includes video data and at least one of audio data and live interaction data. The processing unit 502 processes the live streaming data, to generate, based on an object included in a processing result, a video measurement value and at least one of an audio measurement value and an interaction measurement value. The first generating unit 503 generates a comprehensive measurement value of the live streaming data based on the video measurement value and the at least one of the audio measurement value and the interaction measurement value. The second generating unit 504 finally generates a target video based on the live streaming data in response to a determination of the comprehensive measurement value of the live streaming data satisfying a preset condition. On one hand, a target video is generated automatically; and on the other hand, a basis for generating a target video is determined comprehensively from video data and at least one of audio data and live interaction data, so that quality and efficiency in generating the target video are improved.

Hereinafter, reference is made to FIG. 6, which shows a schematic structural diagram of an electronic device 600 (such as a server shown in FIG. 1) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The electronic device shown in FIG. 6 is only exemplary, and should not indicate any limitation to the function and application scope of the embodiments of the present disclosure.

Figure 6:
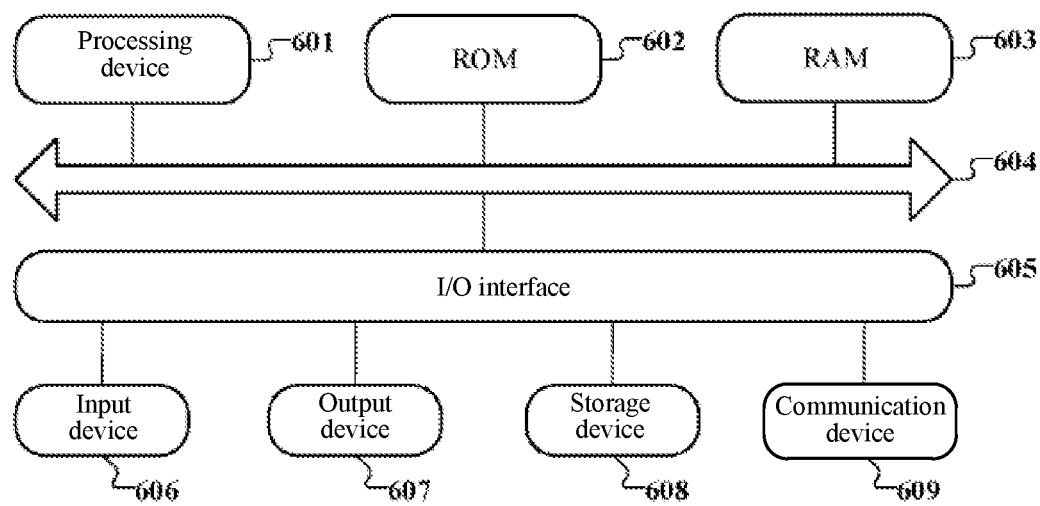
FIG. 6 is a schematic structural diagram of an electronic device suitable for implementing an embodiment of the present disclosure.

As shown in FIG. 6, the electronic device 600 may include a processing device 601 (such as a central processing unit and a graphics processor) which may execute various operations and processing through a program stored in a Read Only Memory (ROM) 602 or a program loaded from the storage device 608 into a Random Access Memory (RAM) 603. The RAM 603 is further configured to store various programs and data required by the electronic device 600. The processing device 601, the ROM 602 and the RAM 603 are connected to each other via a bus 604. An Input/output (I/O) interface 605 is also connected to the bus 604.

Generally, the I/O interface 605 may be connected to: an input device 606, such as a touch screen, a touch panel, a keyboard, a mouse, a camera, a microphone, an accelerometer, and a gyroscope; an output device 607, such as a liquid crystal display (LCD), a speaker, and a vibrator; a storage device 608 such as a magnetic tape and a hard disk; and a communication device 609. The communication device 609 enables the electronic device 600 to perform wireless or wired communication with other devices for data exchanging. Although FIG. 6 shows an electronic device 600 having various components, it should be understood that the illustrated components are not necessarily required to all be implemented or included. Alternatively, more or fewer components may be implemented or included. Each of the blocks shown in FIG. 6 may represent one device, or may represent multiple devices as required.

Particularly, according to some embodiments of the present disclosure, the process described above in conjunction with flow charts may be implemented as a computer program. For example, a computer program product is further provided according to some embodiments of the present disclosure, including a computer program carried on a computer readable medium. The computer program includes program codes for performing the method shown in the flow charts. In the embodiments, the computer program may be downloaded and installed from a network via the communication device 609, or installed from the storage device 608, or installed from the ROM 602. When the computer program is executed by the processing device 601, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

The computer readable medium may be incorporated in the electronic device, or may exist alone without being assembled into the electronic device. The computer readable medium carries one or more programs. The one or more programs, when being executed by the server, cause the server to: acquire live streaming data, where the live streaming data includes video data and at least one of audio data and live interaction data; process the live streaming data to generate, based on an object included in a processing result, a video measurement value and at least one of an audio measurement value and an interaction measurement value; generate, based on the video measurement value and the at least one of the audio measurement value and the interaction measurement value, a comprehensive measurement value of the live streaming data; and generate a target video based on the live streaming data, in response to a determination of the comprehensive measurement value of the live streaming data satisfying a preset condition.

A computer program is further provided in some embodiments of the present disclosure, which causes a computer to implement the method for generating a target video provided in the embodiments.

Computer program code for performing operations in embodiments of the present disclosure may be written in one or more programming languages, or a combination thereof. The programming language includes, but is not limited to, an object oriented programming language, such as Java, Smalltalk, and C++, or conventional procedural programming languages, such as "C" language or python. The program code may be executed entirely on a user computer, or be executed partly on the user computer, or be executed as a stand-alone software package, or be executed partly on the user computer and partly on a remote computer, or be executed entirely on the remote computer or server. In a case that the execution of the program code involves a remote computer, the remote computer may be connected to a user computer via any network, including a local area network (LAN) or a wide area network (WAN), or may be connected to an external computer (for example, via an Internet provided by an Internet service provider).

The flow charts and schematic diagrams in the Figures show the architecture, functionality and operations of possible implementations of the system, method and computer program product provided according to the embodiments of the present disclosure. Each of blocks in the flow charts or schematic diagrams may represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, or sometimes be executed in a reverse order, depending upon functions involved. It should be further noted that each block in the schematic diagrams and/or flow charts, and combinations of blocks in the schematic diagrams and/or flowcharts, may be implemented by a dedicated hardware-based system configured to implement specified functions or operations, or may be implemented by using a combination of dedicated hardware and computer instructions.

The units mentioned in the description of the embodiments of the present disclosure may be implemented by means of software, or otherwise by means of hardware. The described unit may be provided in a processor. For example, it may be described as: a processor including an acquiring unit, a processing unit, a first generating unit and a second generating unit. The designation of a unit does not in any case constitute a limitation to the unit itself. For example, the acquiring unit may also be described as "a unit for acquiring live streaming data, where the live streaming data includes video data and at least one of audio data and live interaction data".

The above description merely illustrates the preferred embodiments of the present disclosure and the technical principles employed. Those skilled in the art should understand that the scope of present disclosure is not limited to the technical solutions formed by certain combination of the above-mentioned technical features, and should also cover other technical solutions formed by any combination of the above-mentioned technical features and any equivalent features without departing from the disclosed concept, for example, a technical solution formed by replacing the features with the technical features disclosed in the present disclosure (but not limited to) with similar functions.

The invention claimed is:

1. A method for generating a target video, comprising:
acquiring live streaming data, wherein the live streaming data comprises video data, and at least one of audio data and live interaction data;
processing the live streaming data to generate, based on an object comprised in a processing result, a video measurement value and at least one of an audio measurement value and an interaction measurement value;
generating, based on the video measurement value and the at least one of the audio measurement value and the interaction measurement value, a comprehensive measurement value of the live streaming data; and
generating a target video based on the live streaming data, in response to a determination of the comprehensive measurement value of the live streaming data satisfying a preset condition,
wherein the live streaming data comprises a plurality of live streaming slice set obtained by slicing the live streaming data in a period, and each live streaming slice set comprises a plurality of live streaming slices, and
the generating a target video based on the live streaming data, in response to a determination of the comprehensive measurement value of the live streaming data satisfying a preset condition comprises:
in a case that a quantity of live streaming slices satisfying a condition for comprehensive measurement value in one of the plurality of live streaming slice set is greater than a target quantity, using the live streaming slice set as the target video, and
wherein the condition for comprehensive measurement value comprises that a comprehensive measurement value corresponding to the live streaming slice is less than the comprehensive measurement value of the live streaming data.

2. The method according to claim 1, wherein the processing the live streaming data to generate, based on an object comprised in a processing result, a video measurement value comprises:
performing image recognition on video frames in the video data, to determine a quantity of images belonging to a first preset category image and a quantity of images belonging to a second preset category image; and
generating the video measurement value based on the quantity of images belonging to the first preset category image and the quantity of images belonging to the second preset category image.

3. The method according to claim 2, wherein the generating the video measurement value based on the quantity of images belonging to the first preset category image and the quantity of images belonging to the second preset category image comprises:
acquiring a preset image weight corresponding to the first preset category image and a preset image weight corresponding to the second preset category image; and
calculating a weighted sum of on the quantity of images belonging to the first preset category image and the quantity of images belonging to the second preset category image, based on the preset image weight corresponding to the first preset category image and the preset image weight corresponding to the second preset category image, to generate the video measurement value.

4. The method according to claim 1, wherein the live streaming data comprises the audio data; and
the processing the live streaming data to generate, based on an object comprised in a processing result, an audio measurement value comprises:
performing speech recognition on the audio data to generate speech-recognition texts;
determining a quantity of speech-recognition texts belonging to a first preset category text in the speech-recognition texts and a quantity of speech-recognition texts belonging to a second preset category text in the speech-recognition texts; and
generating the audio measurement value, based on the quantity of speech-recognition texts belonging to the first preset category text and the quantity of speech-recognition texts belonging to the second preset category text.

5. The method according to claim 1, wherein the live streaming data comprises the live interaction data, and
the processing the live streaming data to generate, based on an object comprised in a processing result, an interaction measurement value comprises:
determining a quantity of target interactions indicated by the live interaction data; and
generating the interaction measurement value based on the quantity of target interactions.

6. The method according to claim 5, wherein the target interactions comprise at least two of a first preset interaction, a second preset interaction and a third preset interaction, and
the generating the interaction measurement value based on the quantity of target interactions comprises:
calculating a weighted sum based on the quantity of target interactions, a preset interaction weight corresponding to the first preset interaction, a preset interaction weight corresponding to the second preset interaction, and a preset interaction weight corresponding to the third preset interaction, to generate the interaction measurement value.

7. The method according to claim 1, wherein the generating, based on the video measurement value and the at least one of the audio measurement value and the interaction measurement value, a comprehensive measurement value of the live streaming data comprises:
acquiring a preset weight corresponding to the video measurement value, and the at least one of a preset weight corresponding to the audio measurement value and a preset weight corresponding to the interaction measurement value;
normalizing the video measurement value and the at least one of the audio measurement value and the interaction measurement value; and
calculating a weighted sum of the normalized video measurement value and the at least one of the normalized audio measurement value and the normalized interaction measurement value, to generate the comprehensive measurement value of the live streaming data.

8. The method according to claim 1, wherein the live streaming data comprises the audio data, and the generating a target video based on the live streaming data comprises:
determining, based on sentence integrity of a recognized text corresponding to the audio data, a start position and an end position for clipping the live streaming data; and
generating the target video based on clipped live streaming data.

9. The method according to claim 8, wherein the generating the target video based on the clipped live streaming data comprises:
adding a special effect to the clipped live streaming data to generate the target video.

10. An apparatus for generating a target video, comprising:
at least one processor;
a storage device storing at least one program, wherein the program, when executed by the processor, causes the processor to
acquire live streaming data, wherein the live streaming data comprises video data, and at least one of audio data and live interaction data;
process the live streaming data to generate, based on an object comprised in a processing result, a video measurement value and at least one of an audio measurement value and an interaction measurement value;
generate, based on the video measurement value and the at least one of the audio measurement value and the interaction measurement value, a comprehensive measurement value of the live streaming data; and
generate a target video based on the live streaming data, in response to a determination of the comprehensive measurement value of the live streaming data satisfying a preset condition,
wherein the live streaming data comprises a plurality of live streaming slice set obtained by slicing the live streaming data in a period, and each live streaming slice set comprises a plurality of live streaming slices, and
the program, when executed by the processor, causes the processor to:
in a case that a quantity of live streaming slices satisfying a condition for comprehensive measurement value in one of the plurality of live streaming slice set is greater than a target quantity, use the live streaming slice set as the target video, and
wherein the condition for comprehensive measurement value comprises that a comprehensive measurement value corresponding to the live streaming slice is less than the comprehensive measurement value of the live streaming data.

11. The apparatus according to claim 10, wherein the program, when executed by the processor, causes the processor to:
perform image recognition on video frames in the video data, to determine a quantity of images belonging to a first preset category image and a quantity of images belonging to a second preset category image; and
generate the video measurement value based on the quantity of images belonging to the first preset category image and the quantity of images belonging to the second preset category image.

12. The apparatus according to claim 11, wherein the program, when executed by the processor, causes the processor to:
acquire a preset image weight corresponding to the first preset category image and a preset image weight corresponding to the second preset category image; and
calculate a weighted sum of on the quantity of images belonging to the first preset category image and the quantity of images belonging to the second preset category image, based on the preset image weight corresponding to the first preset category image and the preset image weight corresponding to the second preset category image, to generate the video measurement value.

13. The apparatus according to claim 10, wherein the live streaming data comprises the audio data; and
the program, when executed by the processor, causes the processor to:
perform speech recognition on the audio data to generate speech-recognition texts;
determine a quantity of speech-recognition texts belonging to a first preset category text in the speech-recognition texts and a quantity of speech-recognition texts belonging to a second preset category text in the speech-recognition texts; and
generate the audio measurement value, based on the quantity of speech-recognition texts belonging to the first preset category text and the quantity of speech-recognition texts belonging to the second preset category text.

14. The apparatus according to claim 10, wherein the live streaming data comprises the live interaction data, and
the program, when executed by the processor, causes the processor to:
determine a quantity of target interactions indicated by the live interaction data; and
generate the interaction measurement value based on the quantity of target interactions.

15. The apparatus according to claim 14, wherein the target interactions comprise at least two of a first preset interaction, a second preset interaction and a third preset interaction, and
the program, when executed by the processor, causes the processor to:
calculate a weighted sum based on the quantity of target interactions, a preset interaction weight corresponding to the first preset interaction, a preset interaction weight corresponding to the second preset interaction, and a preset interaction weight corresponding to the third preset interaction, to generate the interaction measurement value.

16. The apparatus according to claim 10, wherein the program, when executed by the processor, causes the processor to:
acquire a preset weight corresponding to the video measurement value, and the at least one of a preset weight corresponding to the audio measurement value and a preset weight corresponding to the interaction measurement value;
normalize the video measurement value and the at least one of the audio measurement value and the interaction measurement value; and
calculate a weighted sum of the normalized video measurement value and the at least one of the normalized audio measurement value and the normalized interaction measurement value, to generate the comprehensive measurement value of the live streaming data.

17. The apparatus according to claim 10, wherein the live streaming data comprises the audio data, and
the program, when executed by the processor, causes the processor to:
determine, based on sentence integrity of a recognized text corresponding to the audio data, a start position and an end position for clipping the live streaming data; and
generate the target video based on clipped live streaming data.

18. The apparatus according to claim 17, wherein the program, when executed by the processor, causes the processor to:
add a special effect to the clipped live streaming data to generate the target video.

19. A non-transitory computer-readable medium having a computer program stored thereon, wherein
the program, when executed by a processor, causes the processor to
acquire live streaming data, wherein the live streaming data comprises video data, and at least one of audio data and live interaction data;
process the live streaming data to generate, based on an object comprised in a processing result, a video measurement value and at least one of an audio measurement value and an interaction measurement value;
generate, based on the video measurement value and the at least one of the audio measurement value and the interaction measurement value, a comprehensive measurement value of the live streaming data; and
generate a target video based on the live streaming data, in response to a determination of the comprehensive measurement value of the live streaming data satisfying a preset condition,
wherein the live streaming data comprises a plurality of live streaming slice set obtained by slicing the live streaming data in a period, and each live streaming slice set comprises a plurality of live streaming slices, and
the program, when executed by the processor, causes the processor to:
in a case that a quantity of live streaming slices satisfying a condition for comprehensive measurement value in one of the plurality of live streaming slice set is greater than a target quantity, use the live streaming slice set as the target video, and
wherein the condition for comprehensive measurement value comprises that a comprehensive measurement value corresponding to the live streaming slice is less than the comprehensive measurement value of the live streaming data.

20. A computer program product comprising:
computer program instructions stored in a non-transitory computer readable storage medium,
wherein the computer program instructions, when executed by a computer, cause the computer to implement the method according to claim 1.

* * * * *